United States Patent Office 3,030,264
Patented Apr. 17, 1962

3,030,264
1,2-BIS(OXYCARBONYL)ETHYL PHOS-
PHINOTHIOATES
Joseph W. Baker and John P. Chupp, Kirkwood, and
Peter E. Newallis, Crestwood, Mo., assignors to Monsanto Chemical Company, St. Louis, Mo., a corporation of Delaware
No Drawing. Filed Mar. 11, 1960, Ser. No. 14,195
20 Claims. (Cl. 167—22)

This invention relates to new and useful phosphinothioates and to methods of preparing same. Additionally this invention relates to acaricidal (or miticidal) compositions containing the new phosphinothioates as an active ingredient.

The new compounds of this invention can be termed 1,2-bis(oxycarbonyl)ethyl phosphinothioates and can be represented by the formula

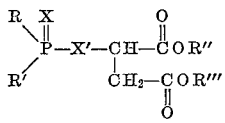

wherein R and R' are like or unlike lower alkyl radicals; wherein R'' and R''' are like or unlike hydrocarbon radicals containing from 1 to 7 carbon atoms; and wherein X and X' are chalkogens of atomic weight less than 40 (i.e. sulfur or oxygen) but wherein at least one of X and X' is sulfur.

By the terms "lower alkyl" or "lower alkyl radicals" as employed herein and in the appended claims is meant an alkyl radical containing from 1 to 5 carbon atoms as exemplified by methyl, ethyl, propyl, butyl, amyl, and the various isomeric forms thereof. By the expression "hydrocarbon radical containing from 1 to 7 carbon atoms" as employed herein and in the appended claims is meant those aryl, aralkyl, alkaryl, cycloalkyl, alkenyl and alkyl radicals containing not more than 7 carbon atoms as exemplified by phenyl, tolyl, benzyl, cyclohexyl, cyclopentyl, allyl, methallyl, methyl, ethyl, propyl, butyl, amyl, hexyl, heptyl, and the various isomeric forms thereof. It is preferred that R and R' be like or unlike alkyl radicals containing from 1 to 3 carbon atoms (i.e. methyl, ethyl, n-propyl or isopropyl) and that R'' and R''' be like or unlike aliphatic hydrocarbon radicals containing from 1 to 3 carbon atoms (i.e. methyl, ethyl, n-propyl, isopropyl or allyl).

The phosphinothioates of this invention can be prepared by reacting in an anhydrous system a halide of the formula

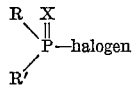

wherein R, R' and X have the aforedescribed significance and wherein the term "halogen" means a halogen having an atomic number above 9 but not higher than 35 (i.e. chlorine or bromine, preferably chlorine) with a substantially equimolecular amount of a compound of the formula

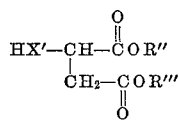

wherein X', R'' and R''' have the aforedescribed significance in the presence of an inert organic liquid or solvent (e.g. benzene, toluene, xylene, acetone, methyl ethyl ketone, carbon tetrachloride, etc.) and a hydrogen halide scavenging agent (e.g. sodium carbonate, potassium carbonate, the tertiary organic amines such as triethylamine, tributylamine, dimethylaniline, choline, lutidine, pyridine, etc.) in an amount sufficient to absorb the hydrogen halide by product. The hydrogen halide scavenging agent can be added in an equivalent amount at the beginning of the reaction or throughout the course of the reaction. While a wide range of reaction temperatures can be employed provided the system is fluid (i.e. a temperature above the freezing point of the system and up to and including the boiling point of the system) it is preferred to employ a reaction temperature in the range of 20° C. to 120° C.

Phosphinothioates of this invention of the formula

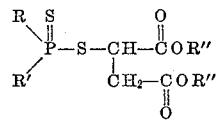

wherein R, R', R'' and R''' have the aforedescribed significance can also be prepared by reacting in an anhydrous system a dialkyl phosphinodithioic acid of the formula

with a substantially equimolecular proportion of a compound of the formula

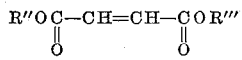

which unsaturated reactants include the neutral maleate esters and the neutral fumarate esters. While a wide range of reaction temperatures can be employed provided the system is fluid (i.e. a temperature above the freezing point of the system and up to and including the boiling point of the system) it is preferred to employ a reaction temperature in the range of 20° C. to 120° C. This reaction can be accelerated by the use of aliphatic tertiary organic amine catalysts, e.g. triethylamine, triisopropylamine, tri-n-butylamine and the like. Any catalytic amount can be used which amount generally will be in the range of 0.2 to 2.0% by weight of the weight of the total reactants. Where desired an inert solvent or liquid such as benzene, toluene, acetone, butanone, etc. can be used, however, in general such is not necessary. Where desired a small amount of a polymerization inhibitor, e.g. hydroquinone, can be employed.

As illustrative of the phosphinothioates of this invention is the following:

S-[1,2-bis(methoxycarbonyl)ethyl] dimethylphosphinothioate
O-[1,2-bis(methoxycarbonyl)ethyl] dimethylphosphinothioate
S-[1,2-bis(methoxycarbonyl)ethyl] dimethylphosphinodithioate
S-[1,2-bis(ethoxycarbonyl)ethyl] dimethylphosphinodithioate
S-[1,2-bis(ethoxycarbonyl)ethyl] (methyl)(ethyl) phosphinothioate
S-[1,2-bis(ethoxycarbonyl)ethyl] (methyl)(isopropyl) phosphinodithioate
S-[1,2-bis(methoxycarbonyl)ethyl] diethylphosphinothioate
S-[1,2-bis(ethoxycarbonyl)ethyl] diethylphosphinodithioate
O-[1,2-bis(isopropoxycarbonyl)ethyl] dimethylphosphinothioate
S-[1,2-bis(ethoxycarbonyl)ethyl] diisopropylphosphinodithioate
S-[1,2-bis(allyloxycarbonyl)ethyl] dimethylphosphinodithioate O-[1,2-bis(n-butoxycarbonyl)ethyl] dimethylphosphinothioate S-[1,2-bis(isobutoxycarbonyl)ethyl] diethylphosphinodithioate S-[1,2-bis(phenoxycarbonyl)ethyl] diethylphosphinothioate S-[1,2-bis(phenoxycarbonyl)ethyl] diethylphosphinodithioate S-[1,2-bis(cyclohexyloxycarbonyl)ethyl] dimethylphosphinodithioate S-[1,2-bis(benzyloxycarbonyl)ethyl] dimethylphosphinodithioate S-[1,2-bis(allyloxycarbonyl)ethyl] diisoamylphosphinodithioate S-[1-(methoxycarbonyl)2-(allyloxycarbonyl)ethyl] diethylphosphinodithioate S-[1-allyloxycarbonyl)2-(methoxycarbonyl)ethyl] diethylphosphinodithioate As illustrative of the preparation of the compounds of this invention is the following:

*Example I*

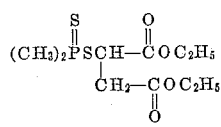

To a suitable reaction vessel equipped with a thermometer, agitator and reflux condenser is charged 90 parts by weight of benzene, 14.4 parts by weight of diethyl mercaptosuccinate, 7.1 parts by weight of triethylamine. To this mix is added while agitating 9.0 parts by weight of dimethylphosphinothioic chloride. The contents of the reaction vessel are heated for 6 hours at 70–80° C., cooled to room temperature and filtered. The filtrate is then washed first with 5% aqueous sodium carbonate and then with water. The so-washed filtrate is then subjected to vacuum distillation to remove the benzene. The residue, a colorless liquid is S-[1,2-bis(ethoxycarbonyl)ethyl] dimethylphosphinodithioate, which is soluble in acetone but insoluble in water. Analysis: Theory 10.4% P; found 10.2% P.

*Example II*

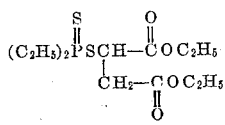

Employing the procedure of Example I but replacing dimethyl phosphinothioic chloride with an equimolecular amount of diethylphosphinothioic chloride there is obtained S-[1,2-bis(ethoxycarbonyl)ethyl] diethylphosphinodithioate, a colorless oil, insoluble in water, but soluble in acetone and benzene.

*Example III*

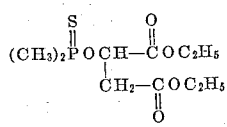

Employing the procedure of Example I but replacing diethyl mercaptosuccinate with an equimolecular amount of diethyl hydroxysuccinate there is obtained O-[1,2-bis(ethoxycarbonyl)ethyl] dimethylphosphinothioate, a colorless oil, soluble in acetone, but insoluble in water.

*Example IV*

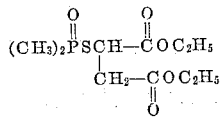

Employing the procedure of Example I but replacing dimethylphosphinothioic chloride with an equimolecular amount of dimethylphosphinoic bromide there is obtained S-[1,2-bis(ethoxycarbonyl)ethyl] dimethylphosphinothioate, a colorless oil insoluble in water, but soluble in chloroform.

*Example V*

Employing the procedure of Example I but replacing diethyl mercaptosuccinate with an equimolecular amount of diphenyl mercaptosuccinate there is obtained S[1,2-bis(phenoxycarbonyl)ethyl] dimethylphosphinodithioate which liquid is water-insoluble.

*Example VI*

To a suitable recation vessel equipped with an agitator and thermometer is charged 0.1 gram molecular weight of dimethyl maleate and 0.1 gram molecular weight of dimethylphosphinodithioic acid and the mass heated at 70° C. for 15 hours. The residue, a colorless oil is S-[1,2-bis(methoxycarbonyl)ethyl] dimethylphosphinodithioate which is soluble in acetone but insoluble in water.

*Example VII*

Employing the procedure of Example VI but replacing dimethyl maleate with an equimolecular amount of diisobutyl fumarate and replacing dimethylphosphinodithioic acid with an equimolecular amount of diisopropylphosphinothioic acid there is obtained S-[1,2-bis(isobutoxycarbonyl)ethyl] diisopropylphosphinothioate.

*Example VIII*

To a suitable reaction vessel equipped with a thermometer and agitator is charged 0.1 gram molecular weight of diallyl maleate, 0.1 gram molecular weight of dimethylphosphinodithioic acid, 0.5 cc. of triethylamine, and 0.25 gram of hydroquinone. The mass while agitating is then heated at 70° C. for 8 hours. The reaction mass is then cooled to room temperature and is washed first with 3% aqueous sodium carbonate and then with water. The so-washed reaction mass is then dried over anhydrous sodium sulfate and filtered. The filtrate is S-[1,2-bis(allyloxycarbonyl)ethyl] dimethylphosphinodithioate which oily liquid is soluble in acetone but insoluble in water.

The methods by which the phosphinothioates of this invention are isolated will vary slightly with the reactants employed and the product produced. Further purification by selective solvent extraction or by absorptive agents such as activated carbon or clays can precede the removal of the inert organic liquid or solvent. Additionally an inert organic solvent can be added to and in the purification by absorptive agents. However, the product is generally satisfactory for acaricidal (or miticidal) purposes without further purification.

The phosphinothioates of this invention are effective against a wide variety of arachnid pests. As illustrative of the activity but not limitative thereof is the following:

One gram of S-[1,2-bis(ethoxycarbonyl)ethyl] dimethylphosphinodithioate was dissolved in sufficient acetone to make a concentrated solution thereof. Approximately 0.1 cc. of sorbitan monolaurate polyoxyethylene derivative (a commercial water-soluble non-ionic emulsifying agent) is then mixed with the concentrate. To this mixture and with agitation is added sufficient water to provide an aqueous emulsion having a concentration of 0.1% by weight of S-[1,2-bis(ethoxycarbonyl)ethyl] dimethylphosphinodithioate. Thereupon lima bean plant leaves infested with the two-spotted spider mite, *Tetranychus telarius* (L.), are dipped in the aqueous emulsion, withdrawn, and set aside for observation. At the end of 48 hours a 50% kill of the mobile stages of the mite was noted. Similar results against the mobile stages of the same mite are obtained employing S-[1,2-bis-(ethoxycarbonyl)ethyl] diethylphosphinodithioate.

Systemic activity was also observed against a wide variety of arachnids. For example against the two-spotted spider mite, *Tetranychus telarius* (L.), a 90% kill was observed employing S-[1,2-bis(ethoxycarbonyl)ethyl] dimethylphosphinodithioate at a concentration of 0.01% by weight.

Although the phosphinothiates of this invention are useful per se in controlling a wide variety of arachnid pests, it is preferable that they be supplied to the pests or to the environment of the pest or pests in a dispersed form in a suitable extending agent.

In the instant specification and appended claims it is to be understood that the term "dispersed" is used in its widest possible sense. When it is said that the phosphinothioates of this invention are dispersed, it means that the particles of the phosphinothioates of this invention may be molecular in size and held in true solution in a suitable organic solvent. It means further, that the particles may be colloidal in size and distributed throughout a liquid phase in the form of suspensions or emulsions or in the form of particles held in suspension by wetting agents. It also includes particles which are distributed in a semi-solid viscous carrier such as petrolatum or soap or other ointment base in which they may be actually dissolved in the semi-solid or held in suspension in the semi-solid with the aid of suitable wetting or emulsifying agents. The term "dispersed" also means that the particles may be mixed with and distributed throughout a solid carrier providing a mixture in particulate form, e.g., pellets, granules, powders, or dusts. The term "dispersed" also includes mixtures which are suitable for use as aerosols including solutions, suspensions, or emulsions of the phosphinothiates of this invention in a carrier such as dichlorodifluoromethane and like fluorochloroalkanes which boil below room temperature at atmospheric pressure.

In the instant specification and appended claims it is to be understood that the expression "extending agent" includes any and all of those substances in which the phosphinothioates of this invention are dispersed. It includes, therefore, the solvents of a true solution, the liquid phase of suspensions, emulsions, or aerosols, the semi-solid carrier of ointments and the solid phase of particulate solids, e.g. pellets, granules, dusts and powders.

The exact concentration of the phosphinothioates of this invention employed in combating or controlling arachnid pests can vary considerably provided the required dosage (i.e. toxic or lethal amount) thereof is supplied to the pests or to the environment of the pests. When the extending agent is a liquid or mixture of liquids (e.g. as in solutions, suspensions, emulsions or aerosols) the concentration of the phosphinothioate employed to supply the desired dosage generally will be in the range of 0.001 to 50 percent by weight. When the extending agent is a semi-solid or solid, the concentration of the phosphinothioate employed to supply the desired dosage generally will be in the range of 0.1 to 25 percent by weight. From a practical point of view, the manufacturer must supply the agriculturist with a low-cost concentrate or spray base or particulate solid base in such form that, by merely mixing with water or solid extender (e.g. powdered clay or talc) or other low-cost material available to the agriculturist at the point of use, he will have an easily prepared acaricidal spray or particulate solid. In such a concentrate composition, the phosphinothioate generally will be present in a concentration of 5 to 95 percent by weight, the residue being any one or more of the well-known acaricidal adjuvants, such as the various surface-active agents (e.g., detergents, a soap or other emulsifying or wetting agent, surface-active clays), solvents, diluents, carrier media, adhesives, spreading agents, humectants, and the like.

There are a large number of organic liquids which can be used for the preparation of solutions, suspensions, or emulsions of the phosphinothioates of this invention. For example, isopropyl ether, acetone, methyl ethyl ketone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., at atmospheric pressure and having a flash point above about 80° F., particularly kerosene), mineral oils having an unsulfonatable residue above about 80 percent and preferably above about 90 percent. In those instances wherein there may be concern about the phytoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent.

When the phosphinothioates of this invention are to be supplied to the arachnid pests or to the environment of the pests as aerosols, it is convenient to dissolve them in a suitable solvent and disperse the resulting solution in dichlorodifluoromethane or like chlorofluoroalkane which boils below room temperature at atmospheric pressure.

The phosphinothioates of this invention are preferably supplied to the arachnid pests or to the environment of the arachnid pests in the form of emulsions or suspensions. Emulsions or suspensions are prepared by dispersing the phosphinothioates of this invention either per se or in the form of an organic solution thereof in water with the aid of a water-soluble surfactant. The term "surfactant" as employed here and in the appended claims is used as in volume II of Schwartz, Perry and Berch's "Surface Active Agents and Detergents" (1958, Interscience Publishers, Inc. New York) in place of the expression "emulsifying agent" to connote generically the various "emulsifying agents," "dispersing agents" "wetting agents" and "spreading agents," that are adapted to be admixed with the active ingredients in the water vehicle or carrier in which they are insoluble through lowering the surface tension of the water (see also Frear "Chemistry of Insecticides, Fungicides and Herbicides," second edition page 280). These surfactants include the well-known capillary-active substances which may be anion-active (or anionic), cation-active (or cationic) or non-ionizing (or non-ionic) which are described in detail in volume I and II of Schwartz, Perry and Berch's "Surface Active Agents and Detergents" (1958, Interscience Publishers, Inc., New York) and also in the November, 1947, issue of Chemical Industries (pages 811–824) in an article entitled "Synthetic Detergents" by John W. McCutcheon and also in the July, August, September and October, 1952 issues of Soap and Sanitary Chemicals under the title "Synthetic Detergents." The disclosures of these articles with respect to surfactants, i.e. the anion-active, cation-active and non-ionizing capillary active substances, are incorporated in this specification by reference in order to avoid unnecessary enlargement of this specification. The preferred surfactants are the water-soluble anionic surface active agents and water soluble non-ionic surface-active agents set forth in U.S. 2,846,398 (issued August 5, 1958). In general it is preferred that a mixture of water-soluble anionic and water-soluble non-ionic surfactants be employed.

The phosphinothioates of this invention can be dispersed by suitable methods (e.g. tumbling or grinding) in solid extending agents either of organic or inorganic nature and supplied to the arachnid pest environment in particulate form. Such solid materials include, for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include, for example, such materials of organic nature as powdered cork, powdered wood, and powdered walnut shells. The preferred solid carriers are the adsorbent clays, e.g. bentonite. These mixtures can be used for acaricidal purposes in the dry form, or, by addition of water-soluble surfactants or wetting agents the dry particulate solids can be rendered wettable by water so as to obtain stable aqueous dispersions or suspensions suitable for use as sprayable compositions.

For special purposes the phosphinothioates of this invention can be dispersed in a semi-solid extending agent such as petrolatum or soap (e.g., sodium stearate or oleate or palmitate or mixtures thereof) with or without the aid of solubility promotors and/or surfactants or dispersing agents.

In all of the forms described above the dispersions can be provided ready for use in combatting arachnid pests or they can be provided in a concentrated form suitable for mixing with or dispersing in other extending agents. As illustrative of a particularly useful concentrate is an intimate mixture of phosphinothioates of this invention with a water-soluble surfactant which lowers the surface tension of water in the weight proportions of 0.1 to 15 parts of surfactant with sufficient of the phosphinothioates of this invention to make 100 parts by weight. Such a concentrate is particularly adapted to be made into a spray for combatting various forms of arachnid pests (particularly mites) by the addition of water thereto. As illustrative of such a concentrate is an intimate mixture of 95 parts by weight of S-[1,2-bis(ethoxycarbonyl)-ethyl] dimethylphosphinodithioate and 5 parts by weight of a water-soluble non-ionic surfactant such as the polyoxyethylene derivative of sorbitan monolaurate.

Another useful concentrate adapted to be made into a spray for combatting arachnid pests (particularly mites) is a solution (preferably as concentrated as possible) of a phosphinothioate of this invention is an organic solvent therefor. The said liquid concentrate preferably contains dissolved therein a minor amount (e.g., 0.5 to 10 percent by weight of the weight of the new acaricidal agent) of a surfactant (or emulsifying agent), which surfactant is also water-soluble. As illustrative of such a concentrate is a solution of S-[1,2-bis(ethoxycarbonyl)ethyl] diethylphosphinodithioate in benzene which solution contains dissolved therein a water-soluble alkylaryl sulfonate anionic surfactant.

Of the surfactants aforementioned in preparing the various emulsifiable, wettable or dispersible compositions or concentrates of this invention, the anionic and non-ionic surfactants are preferred. Of the anionic surfactants, the particularly preferred are the well-known water-soluble alkylaryl sulfonates, e.g. sodium decylbenzene sulfonate and sodium dodecylbenzene sulfonate. Of the non-ionic surfactants, the particularly preferred are the water-soluble polyoxyethylene derivatives of alkylphenols (particularly isooctylphenol) and the water soluble polyoxyethylene derivatives of the mono-higher fatty acid esters of sorbitan.

In all of the various dispersions described hereinbefore for acaricidal or miticidal purposes, the active ingredient can be one or more of the compounds of this invention. The compounds of this invention can also be advantageously employed in combination with other pesticides, including, for example, nematocides, bactericides, fungicides, and herbicides. In this manner it is possible to obtain mixtures which are effective against a wide variety of pests and other forms of noxious life.

In controlling or combatting arachnid pests the phosphinothioates of this invention per se or compositions comprising same are supplied to the arachnid pests or to their environment in a lethal or toxic amount. This can be done by dispersing the new acaricidal agent or acaricidal composition comprising same in, on or over an infested environment or in or over an environment the arachnid pests frequent, e.g. agricultural soil or other growth media or other media infested with the arachnid pests for habitational or sustenance or propagational purposes, in any conventional fashion which permits contact between the arachnid pests and the phosphinothioates of this invention. Such dispersing can be brought about by applying the new phosphinothioates per se or sprays or particulate solid compositions containing same to a surface infested with the arachnid pests or attractable to the pests, as for example, the surface of an agricultural soil or other media such as the above ground surface of plants by any of the conventional methods, e.g. power dusters, boom and hand sprayers, and spray dusters. Also for sub-surface application such dispersing can be carried out by simply mixing the new acaricidal agent per se or acaricidal spray or particulate solid composition comprising same with the infested environment or with the environment the arachnid pests frequent, or by employing a liquid carrier for the new acaricidal agent to accomplish subsurface penetration and impregnation thereof therein.

While this invention has been described with respect to certain embodiments, it is to be understood that it is not so limited and that variations and modifications thereof obvious to those skilled in the art can be made without departing from the spirit or scope thereof.

What is claimed is:

1. Phosphinothioates of the formula

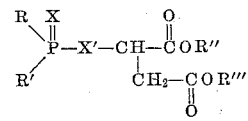

wherein R and R' are lower alkyl radicals; wherein R'' and R''' are hydrocarbon radicals containing from 1 to 7 carbon atoms; and wherein X and X' are chalkogens of atomic weight less than 40 but wherein at least one of X and X' is sulfur.

2. The method of making the compounds of claim 1 which comprises reacting in an anhydrous system an acid halide of the formula

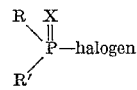

wherein the term "halogen" means a halogen having an atomic number above 9 but not higher than 35 and wherein R, R' and X have the same significance as in claim 1 with a substantially equimolecular amount of a succinate ester of the formula

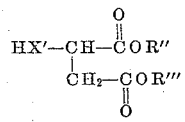

wherein X', R'' and R''' have the same significance as in claim 1 in the presence of an inert organic liquid and a hydrogen halide scavenging agent.

3. An acaricidal composition comprising a compound of claim 1 dispersed in an extending agent.

4. An acaricidal composition comprising a compound of claim 1 dispersed in an extending agent, the composition containing 0.1 to 25 percent by weight of said compound of claim 1, the extending agent being selected from the group consisting of solid and semi-solid extending agents.

5. An acaricidal composition comprising a compound of claim 1 dispersed in a liquid extending agent, the composition containing 0.001 to 50 percent by weight of said compound of claim 1.

6. The method of controlling arachnids which comprises contacting the arachnids with a toxic amount of a compound of claim 1.

7. The method for protection of plants against arachnid attack which comprises applying to the plant an acaracidal amount of at least one compound of claim 1.

8. The method of making compounds of claim 1 wherein X and X' are sulfur which comprises reacting in an anhydrous system a phosphinodithioic acid of the formula

wherein R and R' have the same significance as in claim 1 with a substantially equimolecular proportion of a neutral ester of the formula

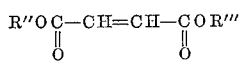

wherein R'' and R''' have the same significance as in claim 1.

9. The method of claim 8 wherein the reaction is carried out in the presence of an organic aliphatic tertiary amine catalyst.

10. The compounds of claim 1 wherein R and R' are alkyl radicals containing not more than 3 carbon atoms and wherein R'' and R''' are aliphatic hydrocarbon radicals containing not more than 3 carbon atoms.

11. An acaricidal composition comprising a compound of claim 10 dispersed in an adsorbent clay, the composition containing 0.1 to 25 percent by weight of said compound of claim 10.

12. An acaricidal concentrate comprising a compound of claim 10 and an insecticidal adjuvant, said concentrate containing from 5 to 95 percent by weight of the compound of claim 10.

13. An acaricidal concentrate comprising a compound of claim 10 dispersed in an organic solvent therefor and having dissolved therein a minor amount of a surfactant, said concentrate forming an emulsion with water upon agitation therewith.

14. An acaricidal concentrate adapted to be made into a sprayable composition by the addition of water comprising a compound of claim 10 in admixture with a water-soluble surfactant in the weight proportion of 0.1 to 15 parts of surfactant and sufficient of said compound of claim 10 to make 100 parts by weight.

15. The method of controlling arachnids which comprises contacting the arachnids with a toxic amount of a compound of claim 10.

16. S - [1,2 - bis(ethoxycarbonyl)ethyl] dimethylphosphinodithioate.

17. S - [1,2 - bis(ethoxycarbonyl)ethyl] diethylphosphinodithioate.

18. S - [1,2 - bis(ethoxycarbonyl)ethyl] dimethylphosphinothioate.

19. S - [1,2-bis(methoxycarbonyl)ethyl] dimethylphosphinodithioate.

20. Phosphinodithioates of the formula

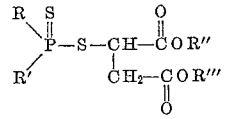

wherein R, R', R'' and R''' are alkyl radicals containing from 1 to 3 carbon atoms.

References Cited in the file of this patent
UNITED STATES PATENTS

| | | |
|---|---|---|
| 2,494,283 | Cassaday | Jan. 10, 1950 |
| 2,578,652 | Cassaday | Dec. 18, 1951 |
| 2,915,429 | Scherer | Dec. 1, 1959 |
| 2,920,993 | Fairchild | Jan. 12, 1960 |